US011348514B2

(12) United States Patent
Melakari et al.

(10) Patent No.: US 11,348,514 B2
(45) Date of Patent: May 31, 2022

(54) LED-BASED DISPLAY APPARATUS AND METHOD INCORPORATING SUB-PIXEL SHIFTING

(71) Applicant: Varjo Technologies Oy, Helsinki (FI)

(72) Inventors: Klaus Melakari, Espoo (FI); Oiva Arvo Oskari Sahlsten, Salo (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/167,151

(22) Filed: Feb. 4, 2021

(65) Prior Publication Data

US 2021/0248952 A1 Aug. 12, 2021

Related U.S. Application Data

(63) Continuation-in-part of application No. 16/783,557, filed on Feb. 6, 2020, now Pat. No. 11,056,030.

(51) Int. Cl.
*G09G 5/00* (2006.01)
*G09G 5/10* (2006.01)
*G09G 5/02* (2006.01)
*G09G 3/32* (2016.01)
(Continued)

(52) U.S. Cl.
CPC .............. *G09G 3/32* (2013.01); *G06F 3/013* (2013.01); *G09G 3/3648* (2013.01); *G09G 2310/0286* (2013.01); *G09G 2340/12* (2013.01); *G09G 2354/00* (2013.01)

(58) Field of Classification Search
CPC ........... G06F 3/013; G06F 3/012; G06F 3/011
See application file for complete search history.

(56) References Cited

U.S. PATENT DOCUMENTS

| 5,742,264 | A | 4/1998 | Inagaki et al. |
| 6,456,340 | B1* | 9/2002 | Margulis .................. G06T 1/20 345/501 |
| 9,710,887 | B1 | 7/2017 | Sahlsten et al. |

(Continued)

FOREIGN PATENT DOCUMENTS

WO    2013171168 A1    11/2013

OTHER PUBLICATIONS

International Search Report and Written Opinion of the International Searching Authority, Application No. PCT/ FI2021/050082, dated Apr. 23, 2021, 19 pages.

(Continued)

*Primary Examiner* — Nan-Ying Yang
(74) *Attorney, Agent, or Firm* — Ziegler IP Law Group, LLC

(57) ABSTRACT

A display apparatus including: image renderer including light-emitting diodes that are to be employed as sub-pixels of image renderer; liquid-crystal device including liquid-crystal structure and control circuit, wherein liquid-crystal structure is arranged in front of light-emitting diodes of image renderer, wherein liquid-crystal structure is to be electrically controlled, via control circuit, to shift light emanating from light-emitting diode to target positions on image plane according to shifting sequence in repeated manner; and processor(s) configured to render output sequence of output image frames via image renderer, wherein shift in light emanating from light-emitting diode to target positions causes resolution of output image frames to appear higher than display resolution of image renderer.

14 Claims, 5 Drawing Sheets

(51) Int. Cl.
*G09G 3/36* (2006.01)
*G06F 3/01* (2006.01)

(56) References Cited

U.S. PATENT DOCUMENTS

| | | |
|---|---|---|
| 2002/0008812 A1* | 1/2002 | Conner .............. G02B 27/1066 349/106 |
| 2017/0270637 A1 | 9/2017 | Perreault et al. |
| 2018/0053284 A1 | 2/2018 | Rodriguez et al. |
| 2018/0075820 A1 | 3/2018 | Hicks et al. |
| 2018/0136471 A1* | 5/2018 | Miller ................ G02B 27/0189 |
| 2019/0243134 A1 | 8/2019 | Perreault et al. |
| 2019/0318677 A1 | 10/2019 | Lu et al. |
| 2019/0354173 A1 | 11/2019 | Young et al. |

OTHER PUBLICATIONS

Notification of Transmittal of The International Search Report and The Written Opinion of The International Searching Authority, or The Declaration, Application No. PCT/FI2020/050073, dated Apr. 30, 2021, 17 pages.

Pct, Notification of Transmittal of The International Search Report and The Written Opinion of The International Searching Authority, or The Declaration, Application No. PCT/FI2021/050085, dated Jun. 14, 2021, 29 pages.

* cited by examiner

LED-BASED DISPLAY APPARATUS AND METHOD INCORPORATING SUB-PIXEL SHIFTING

CROSS-REFERENCE TO RELATED APPLICATIONS

This application is a continuation-in-part of U.S. patent application Ser. No. 16/783,557, titled "DISPLAY APPARATUS AND METHOD OF ENHANCING APPARENT RESOLUTION USING LIQUID-CRYSTAL DEVICE" and filed on Feb. 6, 2020, which is incorporated herein by reference.

TECHNICAL FIELD

The present disclosure relates to LED-based display apparatuses incorporating sub-pixel shifting. Moreover, the present disclosure relates to methods of displaying that are implemented via such LED-based display apparatuses.

BACKGROUND

In recent times, continuous advancements in display technology have been and are being made to improve high-resolution display capabilities of a display device (for example, a head-mounted display (HMD), a television, a desktop computer, a laptop computer, a tablet computer, a phablet, a smartphone, a smartwatch, a projection device, and the like), in order to present high-resolution images to a user of the display device.

Conventional display devices employ various equipment and techniques to generate and present the high-resolution images to be shown to the user of the display device. Some display devices employ pixel-shifting technology wherein light emanating from a given pixel of an image renderer (for example, such as a display, a projector, and the like) is shifted to multiple positions for providing an apparent spatial super-resolution.

However, provision of high spatial resolutions for the images using the pixel-shifting technology has certain problems associated therewith. Firstly, some display devices that employ inorganic-light-emitting diode-based displays and use the pixel-shifting technology, are not well-suited to obtain a required pixel count for providing the high spatial resolutions (namely, high spatial oversampling rates). Since separate inorganic-light-emitting diodes are picked and placed onto a substrate for manufacturing such displays, it is challenging to obtain the required pixel count for providing the high spatial resolution. Secondly, some display devices are prone to a slow response time of a liquid-crystal device and organic-light-emitting diode-based displays. This potentially limits high spatial resolution capabilities of said display devices. Thirdly, for some display devices that employ the pixel-shifting technology, limited brightness (namely, an intensity) associated with the organic-light-emitting diode-based displays constraints a maximum spatial oversampling rate due to a single pixel providing light to the multiple positions. This limits the capability of such display devices in providing ultra high spatial resolutions.

Therefore, in light of the foregoing discussion, there exists a need to overcome the aforementioned drawbacks associated with provision of high-resolution images in specialized devices.

SUMMARY

The present disclosure seeks to provide an LED-based display apparatus incorporating sub-pixel shifting. The present disclosure also seeks to provide a method of displaying that is implemented via such LED-based display apparatus. An aim of the present disclosure is to provide a solution that overcomes at least partially the problems encountered in prior art.

In one aspect, an embodiment of the present disclosure provides a display apparatus comprising:

an image renderer comprising a plurality of light-emitting diodes that are to be employed as sub-pixels of the image renderer;

a liquid-crystal device comprising a liquid-crystal structure and a control circuit, wherein the liquid-crystal structure is arranged in front of the plurality of light-emitting diodes of the image renderer, wherein the liquid-crystal structure is to be electrically controlled, via the control circuit, to shift light emanating from a given light-emitting diode to a plurality of target positions on an image plane according to a shifting sequence in a repeated manner; and at least one processor configured to render an output sequence of output image frames via the image renderer, wherein a shift in the light emanating from the given light-emitting diode to the plurality of target positions causes a resolution of the output image frames to appear higher than a display resolution of the image renderer.

In another aspect, an embodiment of the present disclosure provides a method of displaying, via a display apparatus comprising an image renderer and a liquid-crystal device, the image renderer comprising a plurality of light-emitting diodes that are employed as sub-pixels of the image renderer, the liquid-crystal device comprising a liquid-crystal structure and a control circuit, wherein the liquid-crystal structure is arranged in front of the plurality of light-emitting diodes of the image renderer, the method comprising:

rendering an output sequence of output image frames via the image renderer; and electrically controlling the liquid-crystal structure, via the control circuit, to shift light emanating from a given light-emitting diode to a plurality of target positions on an image plane according to a shifting sequence in a repeated manner, wherein a shift in the light emanating from the given light-emitting diode to the plurality of target positions causes a resolution of the output image frames to appear higher than a display resolution of the image renderer.

Embodiments of the present disclosure substantially eliminate or at least partially address the aforementioned problems in the prior art, and enable resolution enhancement in display apparatuses by way of sub-pixel shifting for presenting high-resolution, high brightness, and high-quality images, via light-emitting diode-based image renderers.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings.

However, the present disclosure is not limited to specific methods and instrumentalities disclosed herein. Moreover, those skilled in the art will understand that the drawings are not to scale. Wherever possible, like elements have been indicated by identical numbers.

Figure 1:
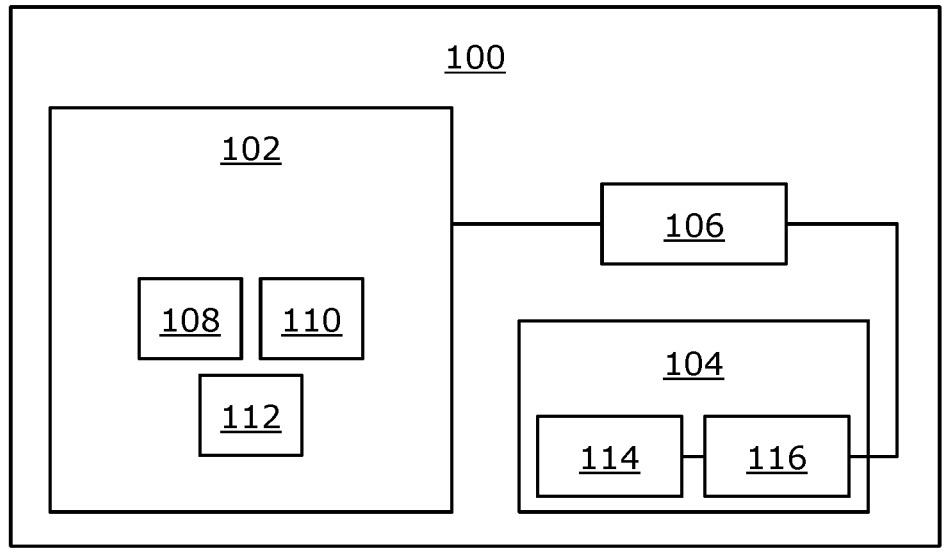
Figure 2:
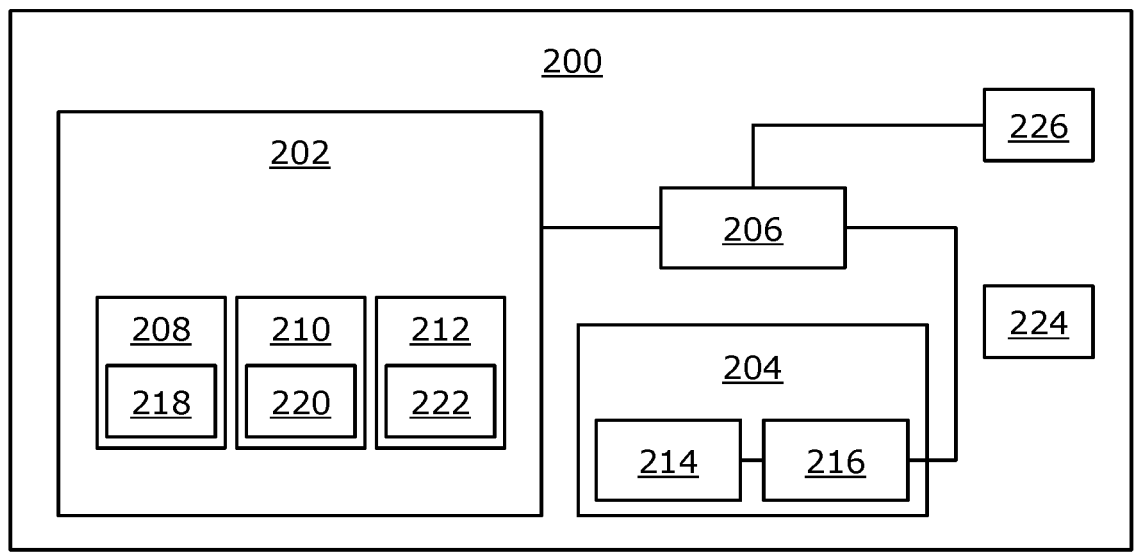
Figure 3A:
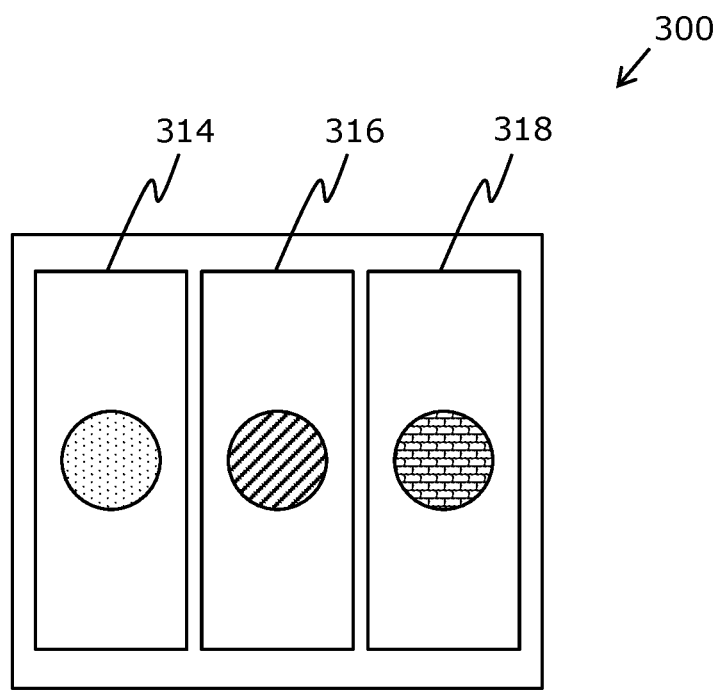
Figure 3B:
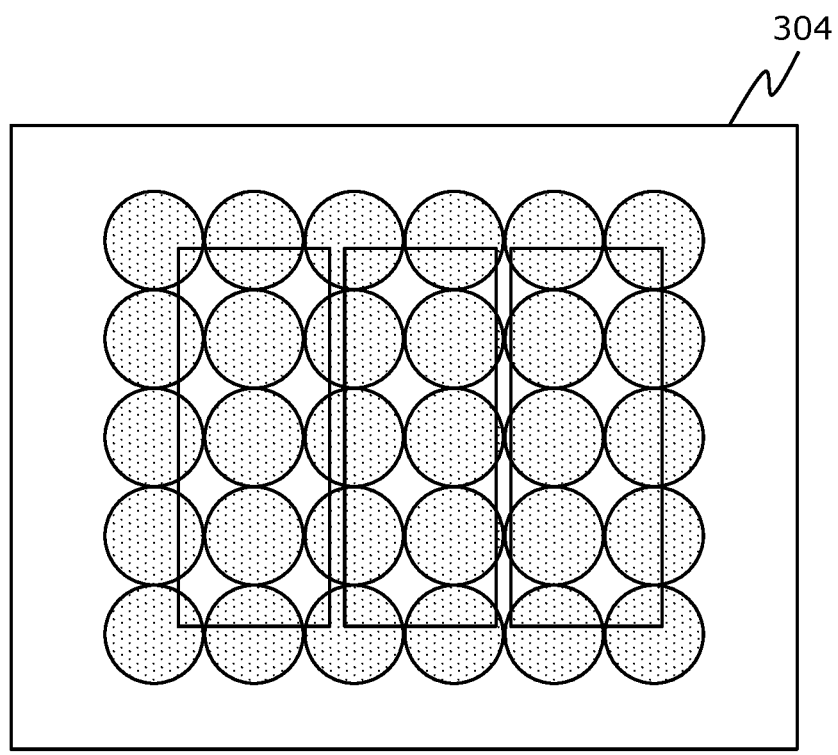
Figure 3C:
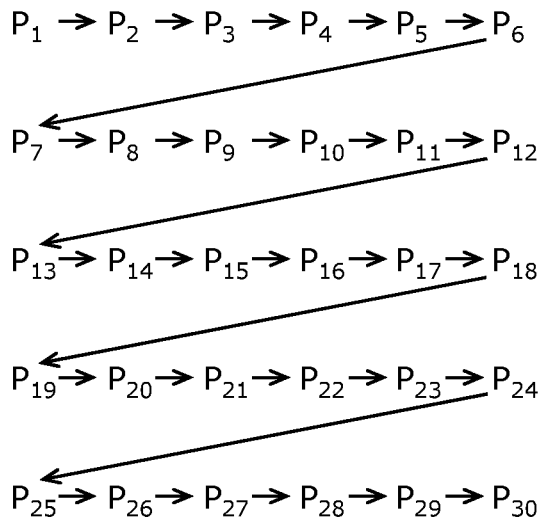
Figure 3D:
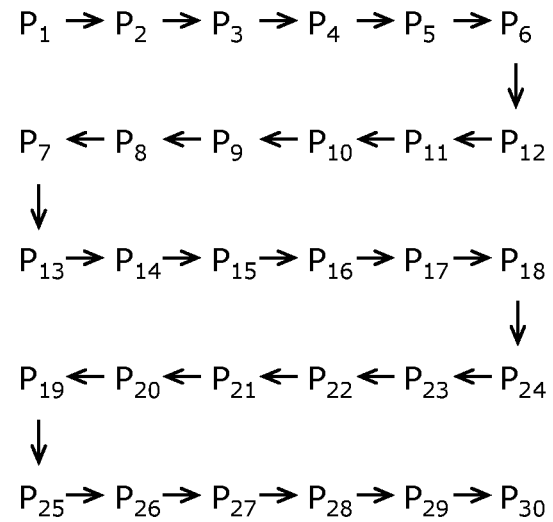
Figure 3E:
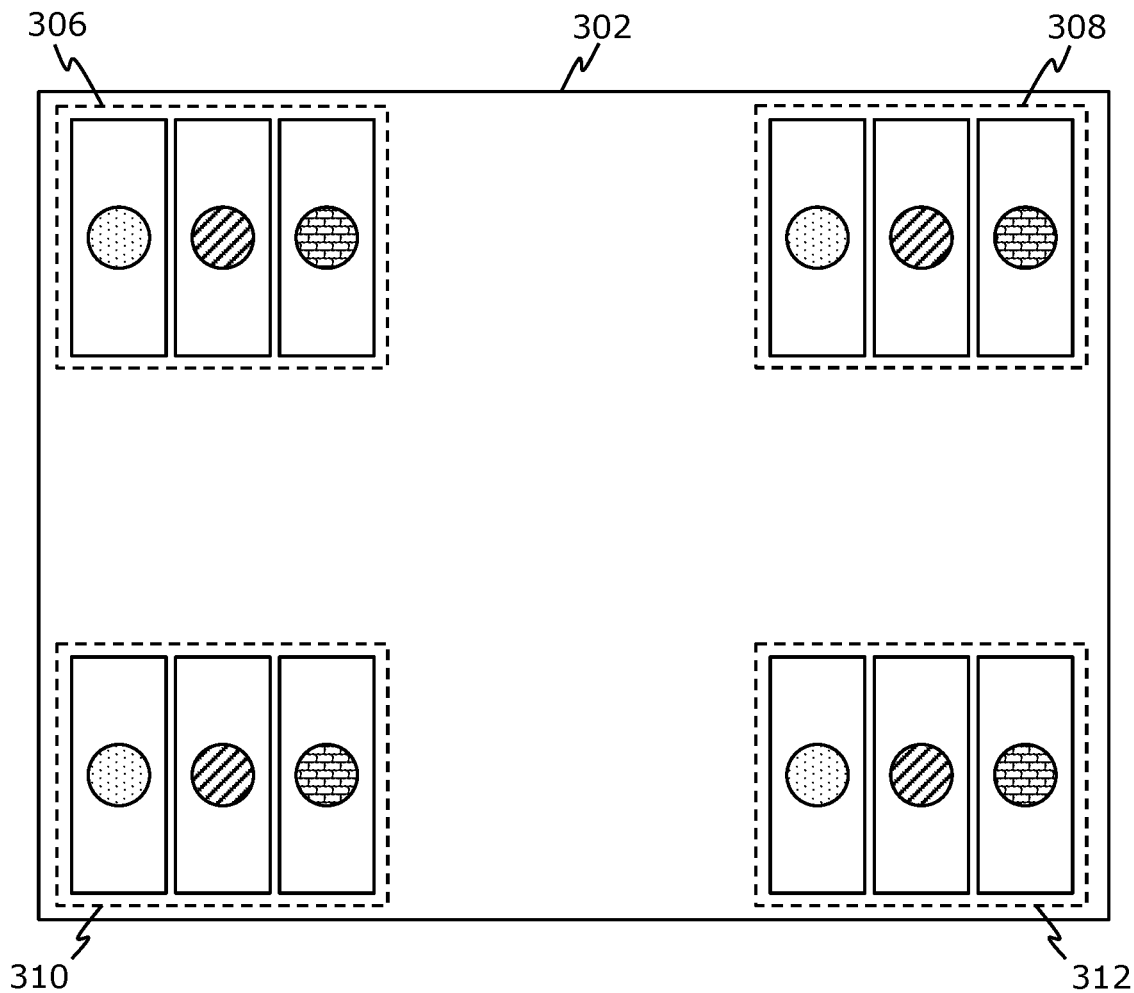
Figures 4A, 4B:
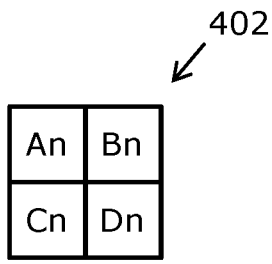
Figure 5:
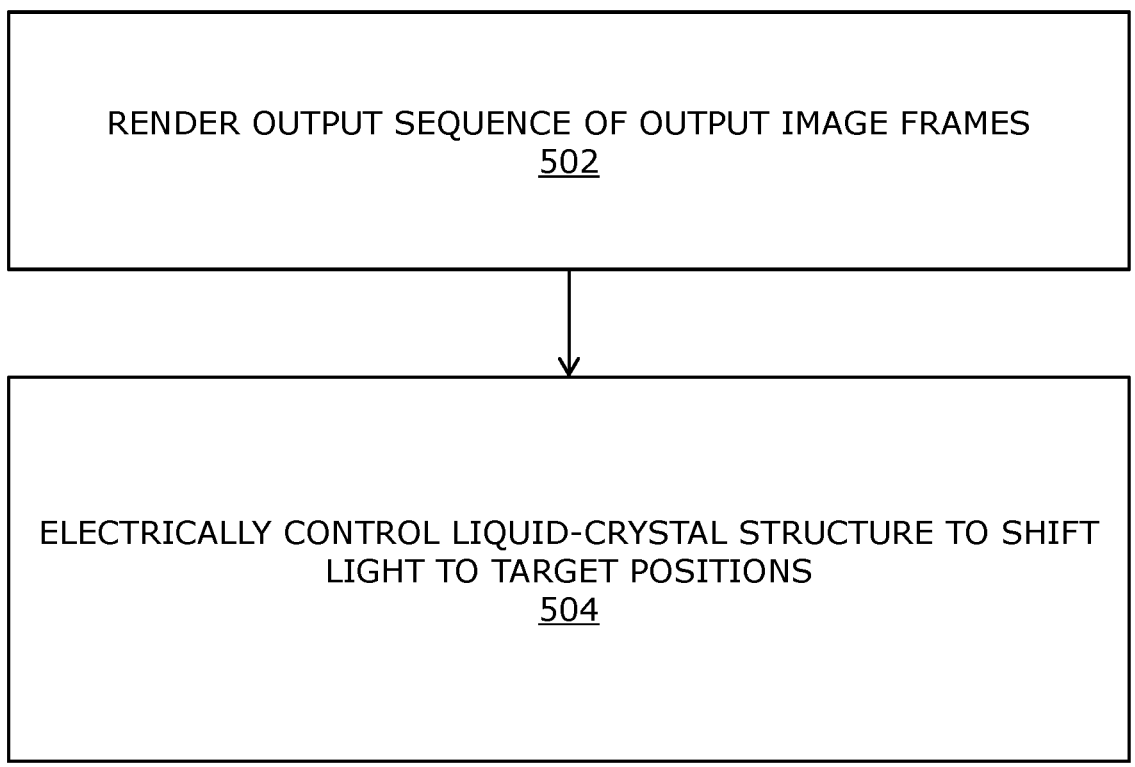

Embodiments of the present disclosure will now be described, by way of example only, with reference to the following diagrams wherein:

FIGS. 1 and 2 illustrate block diagrams of architectures of a display apparatus, in accordance with different embodiments of the present disclosure;

FIG. 3A illustrates a given pixel of an image renderer; FIG. 3B illustrates a plurality of target positions to which light emanating from a given light-emitting diode is to be shifted on an image plane in a repeated manner; FIG. 3C illustrates an exemplary shifting sequence that can be used for shifting the light to the plurality of target positions of FIG. 3B; FIG. 3D illustrates another exemplary shifting sequence that can be used for shifting the light to the plurality of target positions of FIG. 3B; and FIG. 3E illustrates an exemplary arrangement of four pixels of the image renderer, in accordance with an embodiment of the present disclosure;

FIG. 4A illustrates a given output image frame, while FIG. 4B illustrates a given input image frame, in accordance with an embodiment of the present disclosure; and FIG. 5 illustrates steps of a method of displaying via a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:

an image renderer comprising a plurality of light-emitting diodes that are to be employed as sub-pixels of the image renderer;

a liquid-crystal device comprising a liquid-crystal structure and a control circuit, wherein the liquid-crystal structure is arranged in front of the plurality of light-emitting diodes of the image renderer, wherein the liquid-crystal structure is to be electrically controlled, via the control circuit, to shift light emanating from a given light-emitting diode to a plurality of target positions on an image plane according to a shifting sequence in a repeated manner; and at least one processor configured to render an output sequence of output image frames via the image renderer, wherein a shift in the light emanating from the given light-emitting diode to the plurality of target positions causes a resolution of the output image frames to appear higher than a display resolution of the image renderer.

In another aspect, an embodiment of the present disclosure provides a method of displaying, via a display apparatus comprising an image renderer and a liquid-crystal device, the image renderer comprising a plurality of light-emitting diodes that are employed as sub-pixels of the image renderer, the liquid-crystal device comprising a liquid-crystal structure and a control circuit, wherein the liquid-crystal structure is arranged in front of the plurality of light-emitting diodes of the image renderer, the method comprising:

rendering an output sequence of output image frames via the image renderer; and electrically controlling the liquid-crystal structure, via the control circuit, to shift light emanating from a given light-emitting diode to a plurality of target positions on an image plane according to a shifting sequence in a repeated manner, wherein a shift in the light emanating from the given light-emitting diode to the plurality of target positions causes a resolution of the output image frames to appear higher than a display resolution of the image renderer.

The present disclosure provides the aforementioned display apparatus and the aforementioned method of displaying. Herein, the image renderer of the display apparatus is light-emitting diode-based. The resolution of the output image frames (that are visible to a user) appears to be enhanced by shifting light emanating from the plurality of light-emitting diodes to the plurality of positions according to the shifting sequence in the repeated manner. Advantageously, this provides time-based spatial multiplexing of each given light-emitting diode in a manner that an apparent spatial resolution of the image renderer is significantly increased from an actual display resolution of the image renderer. This apparent spatial resolution is the resolution of the output image frames. Additionally, inorganic light-emitting diode-based image renderers are well suited to achieve extremely high overall brightness and nanosecond-level switching times with a higher durability and a higher life as compared to other image renderers (such as micro organic light-emitting diode-based image renderers). Beneficially, a user perceives extremely high visual detail when the output image frames are shown to the user via such image renderers. The method is fast, reliable and can be implemented with ease.

Throughout the present disclosure, the term "display apparatus" refers to a display device that is capable of displaying images. These images optionally constitute a visual scene. Examples of the display apparatus include, but are not limited to, a head-mounted display (HMD), a television, a desktop computer, a laptop computer, a tablet computer, a phablet, a smartphone, a smartwatch, a projection device (such as a projector).

Optionally, the display apparatus is implemented as the HMD. The term "head-mounted display" refers to specialized equipment that is configured to present an extended-reality (XR) environment to a user when said head-mounted display, in operation, is worn by the user on his/her head. The HMD is implemented, for example, as an XR headset, a pair of XR glasses, and the like, that is operable to display a visual scene of the XR environment to the user. In such a case, the output image frames constitute the visual scene. The term "extended-reality" encompasses virtual reality (VR), augmented reality (AR), mixed reality (MR), and the like.

Throughout the present disclosure, the term "image renderer" refers to equipment that, in operation, renders (i.e. displays and/or projects) output image frames that are to be shown to the user of the display apparatus. Herein, the term "output image frame" refers to an image frame that serves as an output to be displayed by the image renderer.

Optionally, the image renderer is implemented as an inorganic light-emitting diode-based display. In this regard, a given output image frame is displayed at said display. Optionally, the inorganic light-emitting diode-based display has a multi-layered structure. Alternatively, optionally, the image renderer is implemented as an inorganic light-emitting diode-based projector. In this regard, the given output image frame is projected onto a projection screen or directly onto a retina of the user's eyes.

It will be appreciated that the image renderer is associated with a specific display resolution. Herein, the "display resolution" of the image renderer refers to a total number of pixels in each dimension of the image renderer, or to a pixel density (namely, a number of pixels per unit distance or area) in the image renderer.

The image renderer comprises at least one pixel. In some implementations, the image renderer comprises a single pixel, whereas in other implementations, the image renderer comprises a plurality of pixels. A given pixel of the image renderer comprises at least one sub-pixel. In some implementations, the given pixel comprises a single sub-pixel, whereas in other implementations, the given pixel comprises at least three sub-pixels. In other words, in some implementations, the given pixel is implemented as a single light-emitting diode, whereas in other implementations, the given pixel is implemented as at least three light-emitting diodes. A given sub-pixel (that is implemented as a light-emitting diode) is a separately addressable single-colour picture element. Optionally, at least three light-emitting diodes form the given pixel of the image renderer. The plurality of sub-pixels of the given pixel are arranged in a required sub-pixel arrangement (for example, a Red-Green-Blue (RGB) sub-pixel arrangement, a Cyan-Magenta-Yellow (CMY) sub-pixel arrangement, a Red-Green-Blue-White (RGBVV) sub-pixel arrangement, a Red-Green-Blue-Blue (RGBB) sub-pixel arrangement, a Red-Green-Green-Blue (RGGB) sub-pixel arrangement, a Cyan-Magenta-Yellow-Black (CMYK) sub-pixel arrangement, a Red-Red-Green-Green-Blue (RRGGB) sub-pixel arrangement, and the like). In a given sub-pixel arrangement, the plurality of sub-pixels are arranged in a required form (for example, such as a one-dimensional array, a two-dimensional grid, a PenTile® matrix layout, and the like).

Optionally, the given pixel comprises three sub-pixels. As an example, in the RGB sub-pixel arrangement, the given pixel comprises a red sub-pixel, a green sub-pixel, and a blue sub-pixel that are arranged in the one-dimensional array. Alternatively, optionally, the given pixel comprises four sub-pixels. As an example, in the RGBW sub-pixel arrangement, the given pixel comprises a red sub-pixel, a green sub-pixel, a blue sub-pixel, and a white sub-pixel that are arranged in the two-dimensional grid. Yet alternatively, optionally, the given pixel comprises five sub-pixels. As an example, in the RRGGB sub-pixel arrangement, the given pixel comprises two red sub-pixels, two green sub-pixels, and one blue sub-pixel that are arranged in the PenTile® matrix layout.

Throughout the present disclosure, the term "light-emitting diode" refers to an optoelectronic element that emits light when current flows through it. The plurality of light-emitting diodes of the image renderer are inorganic light-emitting diodes. It will be appreciated that the given light-emitting diode could be of any size. Optionally, the given light-emitting diode is implemented as a micro light-emitting diode. Optionally, in this regard, a size of a given micro light-emitting diode lies in a range of 2-50 microns (namely, micrometers). As an example, the size of the given micro light-emitting diode can be from 2, 6, 10, 14, 18, 22, 26, 30, 34, 38, 42 or 46 microns up to 6, 10, 14, 18, 22, 26, 30, 34, 38, 42, 46 or 50 microns. Optionally, the given light-emitting diode is implemented as a mini light-emitting diode. Optionally, in this regard, a size of a given mini light-emitting diode lies in a range of 50-300 microns. As an example, the size of the given mini light-emitting diode can be from 50, 60, 70, 80, 90, 100, 110, 120, 130, 140, 150, 160, 170, 180, 190, 200, 210, 220, 230, 240, 250, 260, 270, 280 or 290 microns up to 60, 70, 80, 90, 100, 110, 120, 130, 140, 150, 160, 170, 180, 190, 200, 210, 220, 230, 240, 250, 260, 270, 280, 290 or 300 microns. Optionally, the given light-emitting diode is implemented as a regular light-emitting diode. Optionally, in this regard, a size of a given regular light-emitting diode is greater than 300 microns. In an example, the size of the given regular light-emitting diode may be 380 microns. In another example, the size of the given regular light-emitting diode may be 750 microns. It will be appreciated that the given light-emitting diode could also have any other feasible size that lies outside of the aforesaid ranges.

Optionally, the given light-emitting diode comprises a polarizing element that is employed to polarize the light. Herein, the term "polarizing element" refers to an optical element configured to allow only light of a required polarization orientation to pass therethrough, whilst blocking light of other polarization orientations (namely, light of undefined or mixed polarization orientations) than the required polarization orientation. In an embodiment, the polarizing element is a circular polarizing element. In another embodiment, the polarizing element is a linear polarizing element. Optionally, the polarizing element is implemented by way of at least one of: a thin film polarizer, a Polaroid® polarizing filter, an absorptive crystal polarizer, a polarizing reflector, a birefringent polarizer, a wire grid polarizer. In an example, the polarizing element may be implemented by way of the thin film polarizer including a substrate (for example, such as glass, plate, and the like) whereon at least one thin film of a specialized optical coating is applied. In such a case, the specialized optical coating (for example, such as a dielectric material) may be configured to implement a desired polarization effect. In another example, the polarizing element may be implemented as the birefringent polarizer (for example, such as a liquid crystal variable retarder). It will be appreciated that when the liquid crystal device requires polarized light from the image renderer, the polarizing element is employed to provide the polarized light.

Optionally, the polarizing element is integrated with the given light-emitting diode during fabrication of the given light-emitting diode. In this regard, the polarizing element is integrated with the given light-emitting diode via a light-emitting diode epilayer process, a nanoimprint lithography process, or a similar wafer-level process (wherein a polarizing layer is implemented already on wafer-level) that typically would be prone to challenges in case the implementation of the polarizing element were to be done on ready-made image renderers. It will be appreciated that the polarizing element could be easily integrated on the given light-emitting diode via any of the aforesaid processes. Optionally, the polarizing element is integrated with the given light-emitting diode by implementing manufacturing process cycle(s) to form the polarizing element on the given light-emitting diode.

It will be appreciated that micro-cavities and well-designed reflector geometries could be considered around the given light-emitting diode, when a structure of the given light-emitting diode is formed. This enables the at least one processor to control a light extraction profile to be favourable for the liquid crystal device.

Throughout the present disclosure, the term "liquid-crystal device" refers to a device that enables shifting of light passing therethrough using a liquid-crystal medium. The liquid-crystal device can be understood to steer the light passing therethrough. The liquid-crystal structure contains the liquid-crystal medium. The control circuit is a specialized circuit that electrically controls the liquid-crystal medium contained within the liquid-crystal structure. In operation, the control circuit applies electrical signals to control the liquid-crystal medium contained within the liquid-crystal structure in a required manner, so as to shift light emanating from the given light-emitting diode to the plurality of target positions on the image plane according to the shifting sequence in the repeated manner. Herein, the term "image plane" refers to a given imaginary plane on which the given output image frame is visible to the user. Optionally, the electrical signals applied by the control circuit control an orientation of liquid-crystal molecules of the liquid-crystal medium. Notably, the light emanating from the given light-emitting diode is shifted in a fixed time-based order defined by the shifting sequence. It will be appreciated that the liquid-crystal device is optimized according to the image renderer. For optimum functioning of the display apparatus, the liquid-crystal device is designed according to the display resolution of the image renderer.

Optionally, a distance between two adjacent target positions in the plurality of target positions is less than the size of the given light-emitting diode. In this regard, the light emanating from the given light-emitting diode of the image renderer is shifted by a fraction of a size of the given light-emitting diode.

Optionally, the liquid-crystal structure comprises a plurality of layers of the liquid-crystal medium that are individually and selectively addressable, wherein a given layer is to be selectively addressed to direct light received thereat from the given light-emitting diode or from a previous layer towards a given direction. Optionally, in this regard, the plurality of layers are collectively addressable to direct the light to the plurality of target positions that lie on the imaginary plane extending across two directions in which the light is directed.

Optionally, a number of target positions in the plurality of target positions lies in a range of 20-50. For example, the number of target positions may be from 20, 21, 22, 23, 24, 25, 26, 27, 28, 29, 30, 31, 32, 33, 34, 35, 36, 37, 38, 39, 40, 41, 42, 43, 44, 45, 46, 47, 48 or 49 up to 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50. Alternatively, optionally, the number of target positions in the plurality of target positions lies in a range of 2-20. For example, the number of target positions may be from 2, 3, 4, 5, 6, 7, 8, 9, 10, 11, 12, 13, 14, 15, 16, 17, 18 or 19 up to 3, 4, 5, 6, 7, 8, 9, 10, 11, 12, 13, 14, 15, 16, 17, 18, 19 or 20. Yet alternatively, optionally, the number of target positions in the plurality of target positions lies in a range of 10-40. For example, the number of target positions may be from 10, 12, 14, 16, 18, 20, 22, 24, 26, 28, 30, 32, 34, 36 or 38 up to 12, 14, 16, 18, 20, 22, 24, 26, 28, 30, 32, 34, 36, 38 or 40. Other numbers of target positions that lie outside the aforesaid ranges are also feasible. For example, the number of target positions in the plurality of target positions may lie in a range of 50-200.

It will be appreciated that shifting the light to a large number of target positions would be particularly feasible with implementation of micro/mini inorganic light-emitting diode-based image renderer in the display apparatus to provide higher performance (in terms of providing a higher apparent spatial resolution) when compared to organic light-emitting diode-based image renderers, liquid crystal displays, or similar, owing to extremely fast switching time and high brightness levels of the micro/mini light-emitting diode-based image renderer.

Throughout the present disclosure, the term "shifting sequence" refers to a sequence in which the light emanating from the given light-emitting diode is to be shifted to the plurality of target positions. The shifting sequence is time-based, meaning that the light emanating from the given light-emitting diode is shifted to different target positions (in the plurality of target positions) at different instances of time. The shifting sequence may be a raster scanning sequence, a random sequence, a Halton sequence (for example, 256 or 1024 first locations of Halton (2, 3)), or similar. It will be appreciated that various shifting sequences may be feasible for shifting the light emanating from the given light-emitting diode to the plurality of target positions. In a first example, the light emanating from the given light-emitting diode may be shifted to 30 target positions P1, P2, P3, . . . , P30 through various time instants T1, T2, T3, . . . T30, respectively, according to the raster scanning sequence, in the repeated manner. Advantageously, shifting the light emanating from the given light-emitting diode to the plurality of target positions according to the shifting sequence would provide time-based spatial multiplexing of the given light-emitting diode of the given pixel in a manner that the apparent spatial resolution of the image renderer is significantly increased from the (actual) display resolution. This apparent spatial resolution is the resolution of the output image frames.

Given that the light emanating from the given light-emitting diode is shifted to B target positions in the repeated manner, each light-emitting diode from amongst the plurality of light-emitting diodes would operate (namely, be switched on) at a rate that is B times higher than a frame rate of the image renderer, B being the number of target positions. It will be appreciated that light-emitting diodes (particularly, the micro light-emitting diodes) are well suited to support switching times at a nanosecond level, therefore could easily operate at the rate that is B times higher than the frame rate of the image renderer. Referring to the first example, the given light-emitting diode may be operated 30 times higher the frame rate of the image renderer (which may, for example, be equal to 120 frames per second (FPS)). In such an example, the given light-emitting diode may be switched on for 278 microseconds (calculated as, 1000000÷(120*30)=278 microseconds). From a brightness perspective also, the light-emitting diodes are well suited to perform better than any known high-resolution display technology, even with the fact that the given light-emitting diode would provide $1/B^{th}$ brightness at each target position. Beneficially, employing the light-emitting diodes to achieve a high rate of time-based spatial multiplexing with considerable brightness is feasible. For example, when there are nine target positions, then the given light-emitting diode provides ⅑th brightness at each of the nine target positions.

It will be appreciated that the number of target positions in the plurality of target positions is dependent on a refresh rate of the image renderer. A product of the number of target positions and a frame rate of the image renderer equals the refresh rate of the image renderer.

The plurality of target positions lie within a specific area of the image plane. It will be appreciated that a shape of the area of the image plane that includes the plurality of target positions could be polygonal (for example, rectangular, square, hexagonal, and the like), circular, elliptical, free-form, and the like. It will also be appreciated that said area is optionally defined based on a sub-pixel scheme and spacing between the pixels and/or between the sub-pixels of the image renderer. Optionally, the plurality of target positions of the given pixel form: a polygonal arrangement, a circular arrangement, an elliptical arrangement, a freeform arrangement.

Optionally, a distance between two adjacent pixels of the image renderer is greater than thrice a size of the given light-emitting diode. In this regard, the plurality of pixels are arranged in a sparse manner on a display area of the image renderer. In a sparse arrangement of the plurality of pixels, the distance between two adjacent pixels of the image renderer is greater than a size of a single pixel. As an example, the distance between two adjacent pixels of the image renderer is four times the size of the single pixel (or twelve times the size of the given light-emitting diode). Such image renderers having a sparse arrangement of the plurality of pixels are easy to manufacture and have a high lifetime. As an example, the size of the given light-emitting diode may be 50 microns, and four pixels may be sparsely arranged on the display area of the image renderer in a 2*2 grid. Herein, the distance between two adjacent pixels of the image renderer is greater than 150 microns (calculated as 3*50=150 microns). For example, said distance may be equal to 200 microns.

It will be appreciated that even when a sparsely arranged matrix of the plurality of light-emitting diodes is employed in the image renderer, an entirety of the display area of the image renderer could be filled by shifting the light emanating from the given light-emitting diode to the plurality of target positions. Therefore, even when the display resolution of the image renderer is low, the apparent spatial resolution of the image renderer is increased by light-shifting.

Generally, from a brightness perspective, the light-emitting diode-based displays (in particular, micro light-emitting diode-based displays) have been demonstrated to reach a total brightness of three million nits. As an example, for the image renderer having a sparse arrangement of pixels, the light of a given light-emitting diode may be shifted to 120 target positions to fill gaps between adjacent pixels of the image renderer. In such a case, the total brightness of the display apparatus incorporating 120 target positions would become 25000 nits (calculated as, 3000000÷120=25000 nits). In that case, a brightness level of a single pixel of the (inorganic light-emitting diode-based) image renderer would still be approximately 50 times greater than a typical brightness level of a single pixel of other types of image renderers (such as organic light-emitting diode-based image renderers, liquid crystal-based image renderers, or similar). Thus, the inorganic light-emitting diode-based image renderers are well suited to achieve extremely high apparent spatial resolution and overall brightness. This would yield a fast and extremely bright image renderer with a higher durability and a higher life as compared to other image renderers (such as organic light-emitting diode-based image renderers).

Optionally, the display apparatus further comprises a collimator arranged between the image renderer and the liquid-crystal structure. The collimator focuses light emanating from the plurality of light-emitting diodes of the image renderer as the light travels from the image renderer towards the liquid-crystal structure. In particular, the collimator minimizes spreading of light emanating from each pixel of the image renderer, thereby minimizing blending (or overlapping) of light emanating from one pixel of the image renderer with light emanating from another pixel of the image renderer. Moreover, the collimator allows for properly blending light from the plurality of light-emitting diodes of each pixel before the light is incident upon the liquid-crystal structure to be shifted by the liquid-crystal structure. Therefore, the collimator performs both differentiating and collimating functions for the light emanating from the plurality of pixels of the image renderer. It is to be understood that emissive apertures of two adjacent light-emitting diodes are at a certain distance from each other, this distance being a fraction of a size of the given light-emitting diode. It will be appreciated that the collimator allows to achieve considerably more well-defined emissive apertures in order to improve the apparent spatial resolution of the image renderer.

Optionally, the collimator is implemented as a perforated plate. Alternatively, optionally, the collimator is implemented as a lenticular array. Yet alternatively, optionally, the collimator is implemented as an array of nanotubes, wherein each nanotube of the array collimates light emanating from a single pixel of the image renderer. Still alternatively, optionally, the collimator is implemented as a fibre optic plate.

The at least one processor controls overall operation of the display apparatus. In particular, the at least one processor is coupled to and controls operation of the image renderer and the liquid-crystal device (and specifically, the control circuit of the liquid-crystal device). The output sequence of output image frames is displayed via the image renderer. Upon displaying, the output sequence of output image frames is visible to the user.

The liquid-crystal structure is controlled (via a requisite drive signal) to shift light through itself according to a requisite shifting sequence and number of target positions in the plurality of target positions. Given that the light emanating from the given light-emitting diode is shifted to X target positions in the repeated manner, X output image frames (that are displayed via the image renderer) would be shown to the user at their corresponding X target positions, X being greater than 2 (for example, X being in the range of 2-20, 10-40, 20-50, or similar). The user is unable to discern the shift of the given light-emitting diode and perceives a unified view of the X output image frames having a resolution that is higher than the display resolution. In other words, the resolution of the output image frames appears to be enhanced with respect to the display resolution of the image renderer. Referring to the first example, when the light emanating from the given light-emitting diode of the image renderer is shifted to the 30 target positions P1, P2, P3, . . . , P30 in the repeated manner, the resolution of the output image frames appears 30 times higher than the display resolution of the image renderer.

Optionally, the at least one processor is configured to process an input sequence of input image frames to generate the output sequence of the output image frames, wherein, when processing a given input image frame to generate a given output image frame, the at least one processor is configured to:
  determine a given target position on the image plane to which the light emanating from the given light-emitting diode is to be shifted during display of the given output image frame, based on the shifting sequence; and select a colour value to be displayed via the given light-emitting diode in the given output image frame, from amongst a plurality of colour values provided for the given light-emitting diode in the given input image frame, based on the given target position on the image plane, wherein a number of colour values provided for the given light-emitting diode in the given input image frame is equal to a number of target positions in the plurality of target positions.

Throughout the present disclosure, the term "input image frame" refers to an image frame that serves as an input for generating corresponding output image frames. Notably, the input sequence of input image frames is not shown to the user, whereas the output sequence of output image frames is shown to the user. In an embodiment, the input sequence of input image frames is generated by a rendering application that is executed by any of: a rendering server coupled to the display apparatus, the at least one processor of the display apparatus, or a computer coupled to the display apparatus.

The at least one processor may be understood to be a compositor (namely, a processing unit that is configured to perform at least compositing tasks pertaining to presentation of the output sequence of output image frames to be shown to the user). The compositor is a software module taking various inputs (such as the input sequence of input image frames) and composing (namely, building or generating) the output image frames to be displayed via the image renderer.

Optionally, a number of pixels in the given input image frame is equal to a product of a number of pixels in the given output image frame and the number of target positions. In such a case, the number of pixels in the given input image frame is greater than the number of pixels in the given output image frame, as for each pixel of the given output image frame, the given input image frame includes multiple pixels (equivalent to the number of target positions in the plurality of target positions) that are to be utilized one by one for generating the given pixel in multiple output image frames. It will be appreciated that in this regard, a single input image frame could be processed to generate a plurality of output image frames corresponding to the plurality of target positions. Referring to the first example, a single input image frame may be processed to generate 30 output image frames corresponding to the 30 target positions P1, P2, P3, ..., P30, respectively. In such example, 30 separate input image frames would be not required to generate the 30 output image frames. This is because light-emitting diodes of the image renderer are very fast, and can be employed to achieve an apparent frame rate of 90-120 FPS. This apparent frame rate is a frame rate of unified views (of output image frames) that are perceivable by the user. In this example, for one frame (i.e. one unified view) to be apparent to the user, 30 output image frames are to be rendered. That is, in approximately 10 milliseconds, 30 output image frames can be displayed by the image renderer.

Optionally, framebuffer data for generating the output image frames is readily available and is equal to N times the display resolution of the image renderer, N being the number of target positions in the plurality of target positions. In other words, the framebuffer data (that includes the colour values provided for the given light-emitting diode in the input sequence of input image frames) has a logical resolution that is equal to N times the display resolution of the image renderer. At any given time, only 1/N input pixels of the given input image frame are utilized to generate corresponding pixels of the given output image frame.

Throughout the present disclosure, the term "colour value" refers to a value that is indicative of brightness (namely, an intensity) of the given light-emitting diode. It will be appreciated that a given colour value could be expressed using any number of bits, for example, such as 8 bits, 10 bits, 16 bits, 32 bits, and the like. It will also be appreciated that at least one colour value provided for the at least one light-emitting diode of the given pixel defines a pixel value of the given pixel. Herein, the term "pixel value" of the given pixel refers to an overall colour value (namely, an additive colour value) of the at least one light-emitting diode of the given pixel. In an example, the pixel value of the given pixel (comprising three sub-pixels) within the given output image frame may be equal to 496. Notably, said pixel value may be a sum of colour values '64', '224' and '208' (being represented using 8 bits) displayed via a first light-emitting diode employed for a red sub-pixel, a second light-emitting diode employed for a green sub-pixel, and a third light-emitting diode employed for a blue sub-pixel, respectively, of the given pixel. Upon additive combination of the aforesaid colour values, a resultant colour of the given pixel is produced to be 'turquoise'.

Optionally, the at least one processor is configured to normalize the given colour value to lie in a range of 0 to 1. Optionally, in this regard, the at least one processor employs at least one normalization function for said normalization. The at least one normalization function would map the given colour value that lies in a first range (for example, a range of 0 to 255, or a range of 0 to 1023, or similar) to a corresponding colour value that lies in the range of 0 to 1. Here, in the range of 0 to 1, 0 indicates a lowest brightness value displayed via the given light-emitting diode, while 1 indicates a highest brightness value displayed via the given light-emitting diode. For example, the given colour value displayed via the given light-emitting diode may be from 0, 0.1, 0.2, 0.3, 0.4, 0.5, 0.6, 0.7, 0.8 or 0.9 up to 0.1, 0.2, 0.3, 0.4, 0.5, 0.6, 0.7, 0.8, 0.9 or 1.

It will be appreciated that the at least one processor is required to know the shifting sequence in which the light emanating from the given light-emitting diode is to be shifted to the plurality of target positions, for rendering the output sequence of output image frames. Therefore, optionally, the given target position on the image plane to which the light emanating from the given light-emitting diode is to be shifted during display of the given output image frame is determined, using the shifting sequence, as a target position that corresponds to a time instant of displaying the given output image frame. Then, the colour value to be displayed by the given light-emitting diode in the given output image frame is selected to be one which corresponds to a colour value provided for the given target position, in the given input image frame.

Referring to the first example, 30 colour values Q1, Q2, Q3, ..., Q30 may be provided for the given light-emitting diode in the given input image frame. Herein, for example, when processing the given input image frame to generate a fifth output image frame to be displayed at the time instant T5, the at least one processor may be configured to determine that the target position is P5, and then select the colour value Q5 to be displayed via the given light-emitting diode in the fifth output image frame. Similarly, for example, when processing the given input image frame to generate a twenty-seventh output image frame to be displayed at the time instant T27, the at least one processor may be configured to determine that the target position is P27, and then select the colour value Q27 to be displayed via the given light-emitting diode in the twenty-seventh output image frame.

The display apparatus further comprises means for detecting a gaze direction of a user's eye, wherein the at least one processor is configured to process an input sequence of input image frames, based on the detected gaze direction, to generate the output sequence of output image frames, wherein, when processing a given input image frame to generate a given output image frame, the at least one processor is configured to:

determine a region of interest of the given input image frame based on the detected gaze direction;

identify the region of interest as a first region of the given input image frame;

identify a region of the given input image frame that surrounds the region of interest as a second region of the given input image frame; and generate a first region and a second region of the given output image frame from the first region and the second region of the given input image frame.

Throughout the present disclosure, the term "means for detecting the gaze direction" refers to specialized equipment for detecting and/or following a direction of gaze of the user of the display apparatus, when said user uses the display apparatus to view the output sequence of output image frames. Optionally, the means for detecting the gaze direction is implemented by way of contact lenses with sensors, cameras monitoring the position of the pupil of the user's eye, and the like. Such means for detecting the gaze direction are well-known in the art. The means for detecting the gaze direction is coupled to the at least one processor.

Throughout the present disclosure, the term "region of interest" refers to a region of the visual scene whereat the gaze of the user is directed (namely, focused) when the user views the visual scene. In other words, the region of interest is a fixation region within the visual scene. Optionally, the detected gaze direction is mapped onto the given input image frame to determine the region of interest. The region of interest is focused onto foveas of the user's eyes, and is resolved to a much higher detail as compared to the remaining region(s) of the visual scene. It will be appreciated that the region of interest may be anywhere within the given input image frame. For example, the region of interest may be a central region of the given input image frame, may be a top-right region of the given input frame, and so on.

It will be appreciated that since the first region of the given input image frame (corresponding to the region of interest) is used to generate the first region of the given output image frame, the first region of the given output image frame corresponds to the user's gaze. Likewise, since the second region of the given input image frame (that corresponds to the region of the given input image frame that surrounds the region of interest) is used to generate the second region of a corresponding output image frame, the second region of the output image frame corresponds to a peripheral region of the user's field of view. Optionally, the given output image frame is generated in a manner that the first region of the given output image frame has a higher level of visual detail as compared to the second region of the given output image frame. Moreover, locations of the first region and the second region in the given output image frame vary according to the detected gaze direction in a manner that the first region is focused onto the foveas of the user's eyes, whereas the second region is focused onto the remaining portion of the retinas of the user's eyes. Thus, the given output image frame is actively gaze-contingent, thereby emulating gaze-based active foveation properties of the user's eyes.

Optionally, the given output image frame is produced in a manner that:

a same pixel value of a given pixel in the first region of the given input image frame is associated with a corresponding pixel in the first region of the given output image frame, and pixel values of a set of pixels in the second region of the given input image frame are combined to obtain a pixel value of a given pixel in the second region of the given output image frame.

In this regard, the combining operation incorporates visual information associated with the set of pixels in the second region of the given input image frame into the given pixel in the second region of the given output image frame. As a result of the combining operation, an angular resolution of the second region of the output image frame is lowered from an angular resolution of the second region of the corresponding input image frame. Optionally, when combining the pixel values of the set of pixels in the second region of the given input image frame to generate the given pixel in the second region of the given output image frame, the at least one processor is configured to employ at least one of: pixel binning, weighted averaging, non-weighted averaging, non-linear median filtering, minimum-maximum filtering, interpolation, image scaling (namely, image resizing).

Optionally, a given output image frame comprises a first region and a second region, an angular resolution of the first region is higher than an angular resolution of the second region, while a temporal resolution of the second region is higher than a temporal resolution of the first region. In this regard, the given output image frame has a variable angular resolution. The given output image frame is a foveated image frame as its variable angular resolution emulates foveation properties of the human visual system. The "first region" of the given output image frame has a higher level of visual detail as compared to the "second region" of the given output image frame. In some implementations, the first region is a central region of the given output image frame, whereas in other implementations, the first region can be anywhere within the given output image frame, for example, at a bottom-right region of the given output image frame.

Throughout the present disclosure, the term "angular resolution" of a given region of a given image frame refers to a number of pixels per degree (also referred to as points per degree (PPD)) in the given region. Notably, a high angular resolution of the given region is indicative of a high visual detail of the given region. Throughout the present disclosure, the term "temporal resolution" of a given region of the given output image frame refers to an apparent frame rate of the given region of the given output image frame. In the given output image frame, the technical effect of providing a higher angular resolution in the first region as compared to the second region and a higher temporal resolution in the second region as compared to the first region is that a higher visual detail is perceivable in the first region, whilst reducing any perceivable flicker in the second region of the given output image frame.

It will be appreciated that there can optionally be intermediate regions between the first region of the given input image frame and the second region of the given input image frame. Correspondingly, there are optionally generated intermediate regions between the first region of the given output image frame and the second region of the given output image frame.

Optionally, the given output image frame comprises at least one intermediate region between the first region and the second region, wherein:
- an angular resolution of the at least one intermediate region is higher than the angular resolution of the second region, but is lower than the angular resolution of the first region; and
- a temporal resolution of the at least one intermediate region is lower than the temporal resolution of the second region, but is higher than the temporal resolution of the first region.

The present disclosure also relates to the method as described above. Various embodiments and variants disclosed above, with respect to the aforementioned first aspect, apply mutatis mutandis to the method.

Optionally, in the method, a number of target positions in the plurality of target positions lies in a range of 20-50.

Optionally, in the method, a distance between two adjacent pixels of the image renderer is greater than thrice a size of a given light-emitting diode.

Optionally, when the given light-emitting diode comprises a polarizing element, the method further comprises employing the polarizing element to polarize the light.

Optionally, when the display apparatus further comprises a collimator arranged between the image renderer and the liquid-crystal structure, the method further comprises employing the collimator to collimate the light emanating from the given light-emitting diode.

Optionally, the method further comprises processing an input sequence of input image frames to generate the output sequence of the output image frames, wherein the step of processing a given input image frame to generate a given output image frame comprises:
- determining a given target position on the image plane to which the light emanating from the given light-emitting diode is to be shifted during display of the given output image frame, based on the shifting sequence; and
- selecting a colour value to be displayed via the given light-emitting diode in the given output image frame, from amongst a plurality of colour values provided for the given light-emitting diode in the given input image frame, based on the given target position on the image plane, wherein a number of colour values provided for the given light-emitting diode in the given input image frame is equal to a number of target positions in the plurality of target positions.

Optionally, the method further comprises:
- detecting a gaze direction of a user's eye;
- processing an input sequence of input image frames, based on the detected gaze direction, to generate the output sequence of output image frames, wherein the step of processing a given input image frame to generate a given output image frame comprises:
  - determining a region of interest of the given input image frame based on the detected gaze direction;
  - identifying the region of interest as a first region of the given input image frame;
  - identifying a region of the given input image frame that surrounds the region of interest as a second region of the given input image frame; and
  - generating a first region and a second region of the given output image frame from the first region and the second region of the given input image frame.

Optionally, in the method, wherein a given output image frame comprises a first region and a second region, an angular resolution of the first region is higher than an angular resolution of the second region, while a temporal resolution of the second region is higher than a temporal resolution of the first region.

Experimental Part

A test simulation for the aforementioned display apparatus employing the light-emitting diode-based image renderer was performed. Based on the test simulation, it was observed that inorganic light-emitting diodes could be switched extremely fast to display different colour values at a large number of target positions (for example, from 20-50 target positions), while still achieving brightness levels that were higher than brightness levels of other types of image renderers such as organic light-emitting diode-based displays, liquid crystal displays, or similar. Thus, the display apparatus was found to be capable of providing an apparent spatial resolution that is at least 20-50 times higher than the display resolution of the image renderer. It was observed experimentally that the only limiting factor to such implementations of the display apparatus is how fast the liquid-crystal structure can shift the light emanating from a given light-emitting diode to different target positions.

In another test simulation, the light-emitting diodes of the image renderer were switched to shift the light emanating from the given light-emitting diode to a much larger number of target positions (for example, 120 target positions). Even in such a case, a brightness level of 25000 nits was found to be feasible for the display apparatus, and a brightness level of a single pixel of the image renderer would still be approximately 50 times greater than a typical brightness level of a single pixel of the other types of image renderers.

DETAILED DESCRIPTION OF THE DRAWINGS

Referring to FIG. 1, illustrated is a block diagram of an architecture of a display apparatus 100, in accordance with an embodiment of the present disclosure. The display apparatus 100 comprises an image renderer 102, a liquid-crystal device 104, and at least one processor (depicted as a processor 106). The image renderer 102 comprises a plurality of light-emitting diodes (depicted as light-emitting diodes 108, 110, and 112) that are to be employed as sub-pixels of the image renderer 102. The liquid-crystal device 104 comprises a liquid-crystal structure 114 and a control circuit 116.

Referring to FIG. 2, illustrated is a block diagram of an architecture of a display apparatus 200, in accordance with another embodiment of the present disclosure. The display apparatus 200 comprises an image renderer 202, a liquid-crystal device 204, and at least one processor (depicted as a processor 206). The image renderer 202 comprises a plurality of light-emitting diodes (depicted as light-emitting diodes 208, 210, and 212) that are to be employed as sub-pixels of the image renderer 202. The liquid-crystal device 204 comprises a liquid-crystal structure 214 and a control circuit 216. Furthermore, the light-emitting diodes 208, 210, and 212 comprise a polarizing element 218, 220, and 222, respectively. The display apparatus 200 further comprises a collimator 224 arranged between the image renderer 202 and the liquid-crystal structure 216. The display apparatus 200 further comprises means 226 for detecting a gaze direction of a user's eye. The means 226 is coupled to the processor 206.

It may be understood by a person skilled in the art that the FIGS. 1 and 2 include simplified architectures of different display apparatuses 100 and 200 for sake of clarity, which should not unduly limit the scope of the claims herein. The person skilled in the art will recognize many variations, alternatives, and modifications of embodiments of the present disclosure.

Referring to FIGS. 3A, 3B, 3C, 3D, and 3E, FIG. 3A illustrates a given pixel 300 of an image renderer 302 (shown in FIG. 3E), FIG. 3B illustrates a plurality of target positions to which light emanating from a given light-emitting diode is to be shifted on an image plane 304 in a repeated manner, FIG. 3C illustrates an exemplary shifting sequence that can be used for shifting the light to the plurality of target positions of FIG. 3B, FIG. 3D illustrates another exemplary shifting sequence that can be used for shifting the light to the plurality of target positions of FIG. 3B, and FIG. 3E illustrates an exemplary arrangement of four pixels 306, 308, 310, and 312 of the image renderer 302, in accordance with an embodiment of the present disclosure.

In FIG. 3A, the given pixel 300 is formed by three sub-pixels that are implemented as three light-emitting diodes 314, 316, and 318, arranged in a one-dimensional array. Herein, a dotted hatch pattern represents an emissive cavity of the light-emitting diode 314 corresponding, for example, to a red sub-pixel, a slanted hatch pattern represents an emissive cavity of the light-emitting diode 316 corresponding, for example, to a green sub-pixel, and a brick hatch pattern represents an emissive cavity of the light-emitting diode 318 corresponding, for example, to a blue sub-pixel.

In FIG. 3B, the light emanating from the given light-emitting diode (such as the light-emitting diode 314 corresponding to the red sub-pixel of FIG. 3A) is to be shifted to 30 target positions (depicted as 30 circular dotted hatch patterns) on the image plane 304. These 30 target positions form a 5×6 array.

An order in which the target positions are to be shifted sequentially is indicated by way of arrows in FIGS. 3C and 3D. In FIG. 3C, the shifting sequence is: P1, P2, P3, P4, P5, P6, P7, P8, P9, P10, P11, P12, P13, P14, P15, P16, P17, P18, P19, P20, P21, P22, P23, P24, P25, P26, P27, P28, P29, P30. In FIG. 3D, the shifting sequence is: P1, P2, P3, P4, P5, P6, P12, P11, P10, P9, P8, P7, P13, P14, P15, P16, P17, P18, P24, P23, P22, P21, P20, P19, P25, P26, P27, P28, P29, P30.

In FIG. 3E, the four pixels 306, 308, 310, and 312 of the image renderer 302 are shown to be sparsely arranged, such that a distance between two adjacent pixels (such as the pixels 306 and 308, the pixels 308 and 312, or similar) of the image renderer 302 is greater than thrice a size of a given light-emitting diode (such as any light-emitting diode of the pixels 306, 308, 310, or 312).

It may be understood by a person skilled in the art that the FIG. 3A includes simplified illustration of the given pixel 300 of the image renderer, the FIG. 3B include exemplary target positions to which light-shifting takes place, the FIGS. 3C and 3D include two exemplary shifting sequences, and FIG. 3E shows a simplified arrangement of the pixels 306, 308, 310, and 312 of the image renderer 302, for sake of clarity only, which should not unduly limit the scope of the claims herein. The person skilled in the art will recognize many variations, alternatives, and modifications of embodiments of the present disclosure. As an example, the given pixel 300 may be formed by a single sub-pixel. As another example, the given pixel 300 may be formed by five sub-pixels that are implemented as five light-emitting diodes arranged in a PenTile® matrix layout. As yet another example, the light emanating from the given light-emitting diode may be shifted to 50 positions. These 50 positions may form a centered circular arrangement. As yet another example, other different shifting sequences may be used for shifting the light to the plurality of target positions.

Referring to FIGS. 4A and 4B, FIG. 4A illustrates a given output image frame 402, while FIG. 4B illustrates a given input image frame 404, in accordance with an embodiment of the present disclosure.

In FIG. 4A, the given output image frame 402 has four pixels An, Bn, Cn, and Dn, wherein value of 'n' is 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 for 30 output image frames F1, F2, F3, F4, F5, F6, F7, F8, F9, F10, F11, F12, F13, F14, F15, F16, F17, F18, F19, F20, F21, F22, F23, F24, F25, F26, F27, F28, F29, and F30, respectively. As example, the output image frame F1 comprises four pixels A1, B1, C1, and D1, the output image frame F2 comprises four pixels A2, B2, C2, and D2; and so on. At least one processor (not shown) is configured to process the given input image frame 404 (of FIG. 4B) to generate these 30 output image frames F1-F30.

In FIG. 4B, the given input image frame 404 has 120 pixels (as 4*30=120 pixels (a product of a number of pixels in the given output image frame 402 and a number of target positions, for example such as 30 target positions depicted in FIG. 3B)). A given colour value of a given pixel (and particularly, of light-emitting diodes employed as sub-pixels of the given pixel) in the given output image frame 402 depends on these 30 target positions to which light emanating from the given light-emitting diode of the given pixel is to be shifted during display of the given output image frame 402, according to a shifting sequence. Herein, colour values for each pixel of the given output image frame 402 is selected from colour values provided for corresponding pixels (and particularly, for corresponding light-emitting diodes employed as sub-pixels of such pixels) of the given input image frame 404 according to a requisite target position from amongst the 30 target positions. As an example, when light shifting is done using the shifting sequence as depicted in FIG. 3C, the colour values of (light-emitting diodes of) the pixels A1, A2, A3, . . . , A30 in the 30 output image frames F1, F2, F3, . . . , F30 are selected as colour values provided for (light-emitting diodes of) pixels X1, X2, X3, . . . , X30, respectively, in the given input image frame 404.

Referring to FIG. 5, illustrated are steps of a method of displaying via a display apparatus, in accordance with an embodiment of the present disclosure. The display apparatus comprises an image renderer and a liquid-crystal device, the image renderer comprising a plurality of light-emitting diodes that are employed as sub-pixels of the image renderer, at least three sub-pixels forming a given pixel of the image renderer, the liquid-crystal device comprising a liquid-crystal structure and a control circuit, wherein the liquid-crystal structure is arranged in front of the plurality of light-emitting diodes of the image renderer. At step 502, an output sequence of output image frames is rendered via the image renderer. At step 504, the liquid-crystal structure is electrically controlled, via the control circuit, to shift light emanating from a given light-emitting diode to a plurality of target positions on an image plane according to a shifting sequence in a repeated manner, wherein a shift in the light emanating from the given light-emitting diode to the plurality of target positions causes a resolution of the output image frames to appear higher than a display resolution of the image renderer.

The steps 502 and 504 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   an image renderer comprising a plurality of light-emitting diodes that are to be employed as sub-pixels of the image renderer;
   a liquid-crystal device comprising a liquid-crystal structure and a control circuit, wherein the liquid-crystal structure is arranged in front of the plurality of light-emitting diodes of the image renderer, wherein the liquid-crystal structure is to be electrically controlled, via the control circuit, to shift light emanating from a given light-emitting diode to a plurality of target positions on an image plane according to a shifting sequence in a repeated manner; and
   at least one processor configured to render an output sequence of output image frames via the image renderer, wherein a shift in the light emanating from the given light-emitting diode to the plurality of target positions causes a resolution of the output image frames to appear higher than a display resolution of the image renderer;
   wherein the at least one processor is configured to process an input sequence of input image frames to generate the output sequence of the output image frames, wherein, when processing a given input image frame to generate a given output image frame, the at least one processor is configured to:
      determine a given target position on the image plane to which the light emanating from the given light-emitting diode is to be shifted during display of the given output image frame, based on the shifting sequence; and
      select a colour value to be displayed via the given light-emitting diode in the given output image frame, from amongst a plurality of colour values provided for the given light-emitting diode in the given input image frame, based on the given target position on the image plane, wherein a number of colour values provided for the given light-emitting diode in the given input image frame is equal to a number of target positions in the plurality of target positions.

2. The display apparatus of claim 1, wherein a number of target positions in the plurality of target positions lies in a range of 20-50.

3. The display apparatus of claim 1, wherein a distance between two adjacent pixels of the image renderer is greater than thrice a size of a given light-emitting diode.

4. The display apparatus of claim 1, wherein the given light-emitting diode comprises a polarizing element that is employed to polarize the light.

5. The display apparatus of claim 1, further comprising a collimator arranged between the image renderer and the liquid-crystal structure.

6. The display apparatus of claim 1, further comprising means for detecting a gaze direction of a user's eye, wherein the at least one processor is configured to process an input sequence of input image frames, based on the detected gaze direction, to generate the output sequence of output image frames, wherein, when processing a given input image frame to generate a given output image frame, the at least one processor is configured to:
   determine a region of interest of the given input image frame based on the detected gaze direction;
   identify the region of interest as a first region of the given input image frame;
   identify a region of the given input image frame that surrounds the region of interest as a second region of the given input image frame; and
   generate a first region and a second region of the given output image frame from the first region and the second region of the given input image frame.

7. The display apparatus of claim 1, wherein a given output image frame comprises a first region and a second region, an angular resolution of the first region is higher than an angular resolution of the second region, while a temporal resolution of the second region is higher than a temporal resolution of the first region.

8. A method of displaying, via a display apparatus comprising an image renderer and a liquid-crystal device, the image renderer comprising a plurality of light-emitting diodes that are employed as sub-pixels of the image renderer, the liquid-crystal device comprising a liquid-crystal structure and a control circuit, wherein the liquid-crystal structure is arranged in front of the plurality of light-emitting diodes of the image renderer, the method comprising:
   rendering an output sequence of output image frames via the image renderer;
   electrically controlling the liquid-crystal structure, via the control circuit, to shift light emanating from a given light-emitting diode to a plurality of target positions on an image plane according to a shifting sequence in a repeated manner, wherein a shift in the light emanating from the given light-emitting diode to the plurality of target positions causes a resolution of the output image frames to appear higher than a display resolution of the image renderer;
   processing an input sequence of input image frames to generate the output sequence of the output image frames, wherein the step of processing a given input image frame to generate a given output image frame comprises:
      determining a given target position on the image plane to which the light emanating from the given light-emitting diode is to be shifted during display of the given output image frame, based on the shifting sequence; and
      selecting a colour value to be displayed via the given light-emitting diode in the given output image frame, from amongst a plurality of colour values provided for the given light-emitting diode in the given input image frame, based on the given target position on the image plane, wherein a number of colour values provided for the given light-emitting diode in the given input image frame is equal to a number of target positions in the plurality of target positions.

9. The method of claim 8, wherein a number of target positions in the plurality of target positions lies in a range of 20-50.

10. The method of claim 8, wherein a distance between two adjacent pixels of the image renderer is greater than thrice a size of a given light-emitting diode.

11. The method of claim 8, wherein the given light-emitting diode comprises a polarizing element, the method further comprising employing the polarizing element to polarize the light.

12. The method of claim 8, wherein the display apparatus further comprises a collimator arranged between the image renderer and the liquid-crystal structure, the method further comprising employing the collimator to collimate the light emanating from the given light-emitting diode.

13. The method of claim 8, further comprising:
 detecting a gaze direction of a user's eye;
 processing an input sequence of input image frames, based on the detected gaze direction, to generate the output sequence of output image frames, wherein the step of processing a given input image frame to generate a given output image frame comprises:
  determining a region of interest of the given input image frame based on the detected gaze direction;
  identifying the region of interest as a first region of the given input image frame;
  identifying a region of the given input image frame that surrounds the region of interest as a second region of the given input image frame; and
  generating a first region and a second region of the given output image frame from the first region and the second region of the given input image frame.

14. The method of claim 8, wherein a given output image frame comprises a first region and a second region, an angular resolution of the first region is higher than an angular resolution of the second region, while a temporal resolution of the second region is higher than a temporal resolution of the first region.

* * * * *